United States Patent
Chen et al.

(10) Patent No.: US 12,502,808 B2
(45) Date of Patent: Dec. 23, 2025

(54) MOLECULAR ENCODING OF RECYCLING INFORMATION

(71) Applicant: MICROSOFT TECHNOLOGY LICENSING, LLC, Redmond, WA (US)

(72) Inventors: Yuan-Jyue Chen, Seattle, WA (US); Bichlien Hoang Nguyen, Seattle, WA (US); Jake Allen Smith, Seattle, WA (US); Karin Strauss, Seattle, WA (US); Ranveer Chandra, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 666 days.

(21) Appl. No.: 17/939,915

(22) Filed: Sep. 7, 2022

(65) Prior Publication Data

US 2024/0075655 A1 Mar. 7, 2024

(51) Int. Cl.
| | |
|---|---|
| *B29B 17/02* | (2006.01) |
| *B29B 17/04* | (2006.01) |
| *C08J 11/06* | (2006.01) |
| *B29K 23/00* | (2006.01) |
| *B29K 67/00* | (2006.01) |

(52) U.S. Cl.
CPC .......... *B29B 17/02* (2013.01); *B29B 17/0412* (2013.01); *C08J 11/06* (2013.01); *B29B 2017/0203* (2013.01); *B29B 2017/0282* (2013.01); *B29K 2023/065* (2013.01); *B29K 2067/003* (2013.01); *C08J 2367/02* (2013.01)

(58) Field of Classification Search
USPC ......................................................... 521/48
See application file for complete search history.

(56) References Cited

U.S. PATENT DOCUMENTS

| | | | |
|---|---|---|---|
| 2005/0189255 | A1 | 9/2005 | Safian |
| 2008/0150701 | A1 | 6/2008 | Randmae |
| 2009/0200212 | A1 | 8/2009 | Hachin |
| 2011/0024332 | A1* | 2/2011 | St-Onge ............... B29B 17/00 209/3.3 |

FOREIGN PATENT DOCUMENTS

| | | | |
|---|---|---|---|
| WO | 2020028955 | A1 | 2/2020 |

OTHER PUBLICATIONS

Bohn, et al., "Molecular Data Storage with Zero Synthetic Effort and Simple Read-Out", In Journal of Scientific Reports, vol. 12, Issue 1, Aug. 16, 2022, 8 Pages.
Ding, et al., "Identifying Exogenous DNA in Liquid Foods by Gold Nanoparticles: Potential Applications in Traceability", In Journal of ACS Food Science & Technology, vol. 1, Issue 4, Apr. 13, 2021, pp. 605-613.
Joesaar, et al., "DNA-based Communication in Populations of Synthetic Protocells", In Journal of Nature Nanotechnology, vol. 14, Issue 4, Mar. 4, 2019, pp. 369-378.
McClements, David J., "Encapsulation, Protection, and Release of Hydrophilic Active Components: Potential and Limitations of Colloidal Delivery Systems", In Journal of Advances in Colloid and Interface Science, vol. 219, May 2015, pp. 27-53.
Qian, et al., "Barcoded Microbial System for High-Resolution Object Provenance", In Journal of Science, vol. 368, Issue 6495, Jun. 5, 2020, 6 Pages.
Yang, et al., "Protocellular CRISPR/Cas-Based Diffusive Communication Using Transcriptional RNA Signaling", In Journal of Angewandte Chemie International Edition, Apr. 6, 2022, 8 Pages.
Koch, et al., "A DNA-of-things storage architecture to create materials with embedded memory", In Journal of Nature Biotechnology, Jan. 2020, 9 Pages.
Park, et al., "Development of a DNA isolation device using poly(3,4-dihydroxy-Lphenylalanine)-coated swab for on-site molecular diagnostics", In Journal of Scientific Reports, vol. 09, Article No. 8144, May 31, 2019, pp. 1-10.
Paunescu, et al., "Protection and Deprotection of DNA—High-Temperature Stability of Nucleic Acid Barcodes for Polymer Labeling", In Journal of Angewandte Chemie, vol. 52, Issue 15, Mar. 6, 2013.
Ryu, et al., "Polydopamine Surface Chemistry: A Decade of Discovery", In Journal of ACS Applied Material Interfaces, Mar. 7, 2018, 37 Pages.
"DNA Data Storage Alliance", Retrieved from: https://web.archive.org/web/20220711232453/https://dnastoragealliance.org/, Jul. 11, 2022, 3 Pages.
International Search Report and Written Opinion received for PCT Application No. PCT/US23/028908, mailed on Nov. 16, 2023, 13 pages.

\* cited by examiner

*Primary Examiner* — Terressa Boykin
(74) *Attorney, Agent, or Firm* — Benjamin Keim; Newport IP, LLC

(57) ABSTRACT

Recycling information is associated with objects through the use of molecular tags. The recycling information may describe the type of material that the object is made from as well as provide instructions for recycling. The molecular tags may be polynucleotides or other types of molecules including inorganic molecules. The molecular tags may be embedded within the object or attached to the surface of the object. At the end of the object's life, the molecular tags are read and the recycling information is used to appropriately recycle the object.

20 Claims, 7 Drawing Sheets

MOLECULAR ENCODING OF RECYCLING INFORMATION

BACKGROUND

Recycling is an important part of efforts to reduce waste, reduce pollution, and minimize the need to harvest new raw materials. Recycling can also contribute to reductions in greenhouse gas emissions. However, only a small portion of potentially recyclable materials are recycled. One difficulty is a lack of knowledge regarding how to appropriately recycle an object. For some objects, the type of material used to make the object may be unknown. Additionally, even if the type of material is known, the proper way of recycling may not be known. Analyzing the material to determine what it is made from may be technically difficult and cost prohibitive. Some techniques such as labels or embossed markings, like those present on many plastic items, attempt to provide recycling information. However, by the end of the lifecycle of a product, the label may be damaged or defaced and even embossed markings may not be present on all pieces of recyclable material. Also, a simple label may not be able to fully describe how to recycle the object.

Composite objects that contain components made from different materials, like a shoe, are more difficult to recycle than an object made from a single material such as a plastic bottle. With a composite object, a single label is not sufficient because there are multiple different materials in the object. Multiple labels could be used, but some parts of an object may be too small to label or mark. Additionally, it may be difficult or too expensive to attach labels or make markings during the manufacturing process. Thus, many manufacturers do not place recycling labels on their products especially on products made of multiple different materials.

There is a need to improve how objects are labeled with recycling information. The following disclosure is directed to these and other considerations.

SUMMARY

This disclosure provides methods and compositions of matter that use molecular tags to encode recycling information. The molecular tags are associated with objects either by placement on a surface of the object or by embedding the molecular tags within the object. Recycling information may be any type of information useful for recycling an object such as the type of material the object is made from, instructions for how to recycle the object, and the like. Many different types of molecular tags may be used including polynucleotides (e.g., DNA and RNA) as well as inorganic molecules. At the end of life, the molecular tags are read and the object is recycled according to the recycling information.

Objects that are recycled multiple times may have additional molecular tags added each time a recycled object is created from recycled and/or new material. Thus, the set of molecular tags in an object can provide a record of the object's manufacturing and recycling history. For example, the molecular tags may indicate how many times material in an object has been recycled and provide proof that the object contains recycled material. Due to the small size, molecular tags may be used to provide recycling information for individual parts of a composite object.

Some molecular tags may be affected by environmental conditions experienced by the object such as exposure to heat or chemicals. Certain environmental conditions cause a detectible characteristic of the molecular tags to change, and the changed tag serves as a record of recycling or manufacturing conditions.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
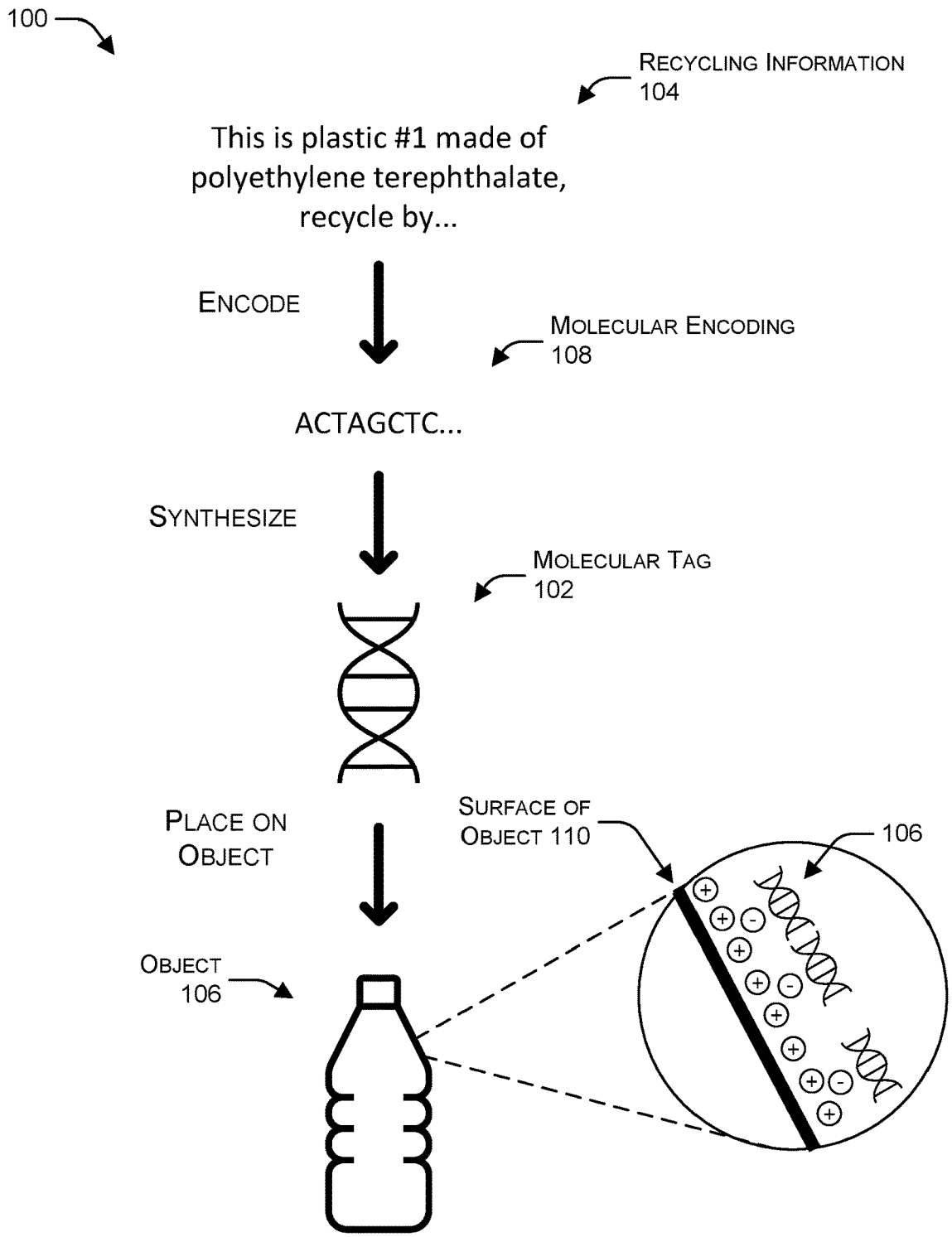
FIG. 1 is a diagram that illustrates use of a molecular tag associated with an object to encode recycling information for that object.

FIG. 1 is a diagram 100 that illustrates use of a molecular tag 102 that encodes recycling information 104 for an object 106. The recycling information 104 is human-readable or interpretable information that is used to determine how to recycle the object 106 and/or that provides information about the manufacture or previous recycling of the object. For example, the recycling information 104 may include the type of material the object is made from such as a type of plastic or metal. The recycling information 104 may include information or instructions on how to recycle the object 106 such as recycling processes or conditions such as temperatures or times. The recycling information 104 may include a timestamp that can include a time, date, year, or other temporal information indicating when the object was manufactured and/or when it was previously recycled. The recycling information 104 may indicate how many times the material in the object has been recycled either as information encoded in the molecular tag 102 or by the number and/or types of molecular tags 102 associated with the object 106. The recycling information 104 may also include an identifier of a facility such as a recycling center that previously recycled the object 106 or a manufacturing site that created the object 106.

The recycling information 104 may be directly encoded by the molecular tag 102 such that decoding of the molecular tag 102 yields the recycling information 104 itself. For example, the recycling information 104 may be a type of material such as "stainless steel." The molecular tag 102 may encode a pointer that indicates where to look up the recycling information. For example, the molecular tag 102 may decode to a database or lookup table address or another type of pointer such as a universal resource locator indicating an address on the World Wide Web. The molecular tag 102 may function similarly to a bar code such that when a computing system is provided with a value encoded by the molecular tag 102, the computing system returns the corresponding recycling information in human-readable form.

The molecular tag 102 is any type of molecule or collection of molecules that through its structure encodes information in a molecular encoding 108. For molecular tags 102 that are polymers, the molecular encoding 108 may be provided by the order of monomer subunits in the polymer. The recycling information 104 is converted to the molecular encoding 108. Polynucleotides are one example of a suitable molecular tag 102. The polynucleotides may be DNA (deoxyribonucleic acid), RNA (ribonucleic acid), or a combination thereof. Multiple techniques and encoding schemes for using polynucleotides to encode arbitrary information are known to those of ordinary skill in the art. For example, a sequence of nucleotide bases may encode binary digits that in turn can be decoded using conventional encoding schemes from information science (e.g., binary to ASCII) to generate human-readable information such as words in a natural language. For a discussion of the use of DNA to encode information see Meiser, L. C., Nguyen, B. H., Chen, Y J. et al. Synthetic DNA applications in information technology. *Nat Commun* 13, 352 (2022). Other types of molecules such as proteins or synthetic polymers with varying monomer subunits may also encode information and be used as the molecular tag 102.

Synthetic, organic polymers ("digital polymers") the encode information in the sequence monomer subunits are also suitable molecular tags 102. Examples of such polymers include poly(phosphodiester)s, oligo(triazole amide)s, oligo(alkoxyamine amide)s, oligourethanes, and oligo(alkoxyamine phosphodiester)s. See Bohn, P., Weisel, M. P., Wolfs, J. et al. Molecular data storage with zero synthetic effort and simple read-out. *Sci Rep* 12, 13878 (2022) for a discussion of digital polymers and other information-encoding molecules.

Metal ions may also be used as molecular tags 102. Both the type of metal and concentration of the ions can be used to encode information. Any type of metal ion may be used such as copper (I) $Cu^+$, gold (I) $Au^+$, mercury (I) $Hg_2^{+2}$, silver $Ag^+$, cadmium $Cd^{2+}$, chromium (II) $Cr^{2+}$, cobalt (II) $Co^{2+}$, copper (II), $Cu^{2+}$, iron (II) $Fe^{2+}$, lead (II) $Pb^{2+}$, manganese (II) $Mn^{2+}$, mercury (II) $Hg^{2+}$, nickel (II), $Ni^{2+}$, platinum (II) $Pt^{2+}$, tin (II) $Sn^{2+}$, zinc $Zn^{2+}$, chromium (III) $Cr^{3+}$, cobalt (III) $Co^{3+}$, gold (III), $Au^{3+}$, iron (III) $Fe^{3+}$, lead (IV) $Pb^{4+}$, and tin (IV) $Sn^{4+}$. For example, $Cu^{2+}$ ions could represent plastic #1 while $Fe^{2+}$ ion represent plastic #2. If more than one metal ion is used, the relative ratios can also be used to encode information. Persons of ordinary skill in the art will be able to create molecular tags 102 using varying combinations and concentrations of metal ions to create barcodes that encode information such as a string of bits. The barcodes can be a pointer to human-readable text that provides the recycling information.

In one implementation, the metal ions are placed on a surface of the object 106. In one implementation, the metal ions are encapsulated in a protective structure such as silica or a nanoparticle. The presence and absence as well as concentrations of metal ions may be read using inductively coupled plasma with techniques known to those of ordinary skill in the art. Spot tests for rapidly identifying trace metals may also be used to detect the presence or absence of metal ions.

One or more chromophores and/or fluorophores may also be used as a molecular tag 102 to encode information. Many types of chromophores are known to those of ordinary skill in the art as dyes such as the azo (monoazo, disazo, triazo, polyazo), anthraquinone, phthalocyanine and triarylmethane dyes. Many types of fluorophores are also known to those of ordinary skill in the art such has fluorescent proteins, non-protein organic fluorophores, and commercially-available dyes. As with other types of molecular tags 102, chromophores and fluorophores may be placed on a surface of the object 106 or encapsulated. The identity of the colors adsorbed or emitted can encode the recycling information 104 or act as a pointer to the recycling information 104. For example, an orange color can indicate that recycling is performed by melting at high heat while a green color indicates that recycling begins with dissolving the object 106 in a chemical solvent.

The molecular tag 102 may also be implemented as a combination of different molecules. The presence or absence of each molecule can encode a bit value that together encode a bit string of arbitrary value. Readout can be performed by any technique for detecting the molecules in a sample such as mass spectrometry, spectroscopic, chromatographic analysis, or nuclear magnetic resonance (NMR). For example, a set of molecules which each show only one specific singlet NMR-signal may be used to create a molecular tag 102. Inclusion of different members of that set encode different bit strings. This technique is described in Bohn, P., Weisel, M. P., Wolfs, J. et al. Molecular data storage with zero synthetic effort and simple read-out. *Sci Rep* 12, 13878 (2022).

The molecular tag 102 may be a synthetic molecular tag or a natural molecular tag. The molecular tag 102 implemented as a synthetic molecular tag is a synthetic molecule created with a specific sequence or structure that provides a molecular encoding 108. If a synthetic molecule is used, the molecular tag 102 is synthesized according to the molecular encoding 108. Synthetic molecules include biological molecules such as polynucleotides and proteins that are artificially synthesized to have a predetermined sequence. Artificial synthesis includes chemical synthesis as well as synthesis using enzymes or cellular machinery including synthesis that is performed inside a cell.

The molecular tag 102 is synthesized by any technique appropriate for the specific type of molecule. For example, DNA can be synthesized with an oligonucleotide synthesizer using techniques well known to the skilled artisan. Similarly, a person of ordinary skill in the art will understand how to synthesize polypeptides using a protein synthesizer. Although the molecular tag 102 is generally referred to herein in the singular, in many implementations a plurality of the same molecule will be synthesized and used in aggregate as the molecular tag 102. For example, a single object 106 may be tagged with millions of DNA molecules that each have the same (or substantially the same) nucleotide sequence.

In some implementations, the molecular tag 102 is a natural molecular tag which is a naturally occurring molecule that was not intentionally synthesized to encode arbitrary information. For example, genetic material from an organism may be used as a molecular tag 102. The genetic material may be inherently present in the object 106 or it may be added. For example, the sequence of the respective genomes of hemp (*Cannabis sativa*) or cotton (*Gossypium hirsutum*) may be used as molecular tags 102 to identify the type of material used to make cloth or fabric. Naturally occurring molecular tags 102 may also be added to an object 106. The naturally occurring molecular tag 102 may be a naturally occurring biological molecule such as a polynucleotide or protein. For example, DNA from a first type of bacteria is added to objects 106 made from polyethylene terephthalate while DNA from a second type of bacteria is added to objects 106 made from high-density polyethylene. The biological molecule may be isolated from a natural source and added or an entire microorganism such as a virus, bacterium, or yeast may be added to provide the biological molecule. In some implementations, a microorganism itself may be added as the molecular tag 102. For example, spores of a first type of yeast are added to objects 106 that are recycled by melting with heat while spores of a second type of yeast are added to objects 106 that are recycled by dissolving in a chemical solution. As used herein, synthetic molecular tags and natural molecular tags are mutually exclusive categories of molecular tags.

The molecular tag 102 can be associated with an object 106 by placing the molecular tag 102 on the object 106 or by embedding the molecular tag 102 within the object. The molecular tag 102 can be applied to a surface of the object 106 such as an outside or outer surface. The molecular tag 102 will be more readily retrievable from an outside surface than from an inside surface. In some implementations, the molecular tag 102 may be simply placed on a surface of the object 106.

Depending on the type of object 106 and molecular tag 102, the molecular tag 102 may adhere or be adsorbed to the object 106 without any additional modifications. For example, polypeptides placed on a cloth of fibrous object 106 may stay in physical contact with the object 106 without further modification. In some implementations either or both of the object 106 and the molecular tag 102 are modified to enhance the association of the molecular tag 102 with the object 106. For example, a surface of the object 106 may be modified or functionalized to increase adsorption of the molecular tag 102.

One suitable technique is creation of electrostatic attraction between the object 106 and the molecular tag 102. For example, polynucleotides are negatively charged so adding a positive charge to a surface of the object 110 can create an electrostatic attraction that tightly binds the polynucleotides to the object 106. In one example implementation, a surface of the object 110 is coated with the polymer poly(3,4-dihydroxy-L-phenylalanine) (L-DOPA). L-DOPA contains carboxyl groups and amine groups together and is hence positively charged at acidic conditions and negatively charged under basic conditions. Using these properties, negatively charged polynucleotides are adsorbed and desorbed on the poly(L-DOPA)-coated surface according to the pH as described in Park, HJ., Cho, H., Jung, H. S. et al. *Development of a DNA isolation device using poly(3,4-dihydroxy-L-phenylalanine)-coated swab for on-site molecular diagnostics.* Sci Rep 9, 8144 (2019). Thus, the polynucleotides can be stably attached to the surface of the object 106 and readily removed when desired by washing with a solution of the appropriate pH.

The molecular tag 102 may be embedded in the object 106 by combining the molecular tag 102 with a material in liquid form that is dried or hardened to create the object 106. For example, the molecular tag 102 may be mixed with a plastic that is in liquid form before an object 106 is created from injection molding the plastic. A molecular tag 102 may also be encapsulated in silica and the silica particles embedded in an object as described in Koch J., Gantenbein S., Masania K., Stark W J, Erlich Y., and Grass R N. A dna-of-things storage architecture to create materials with embedded memory. *Nat Biotechnol.,* 38(1): 39-43, (2020). DNA has also been coupled with gold nanoparticles and placed in liquids to provide barcoding as described in Ding S., Wang L., He Z., Sui Z., Wang G., Takarada T., Maeda M., and Liang X. Identifying Exogenous DNA in Liquid Foods by Gold Nanoparticles: Potential Applications in Traceability. *ACS Food Sci & Tech.* 1 (4), 605-613, (2021).

In some implementations, the molecular tag 102 is protected so that the molecular tag 102 remains intact and maintains the molecular encoding 108 throughout the lifecycle of the object 106. There are various ways of protecting a molecular tag 102 such as coating the molecular tag 102 with a protective material or encapsulating the molecular tag 102 in a protective covering. The specific technique and type of protection will depend on the type of molecular tag 102 and the conditions that the object 106 is expected to experience. One technique for protecting polynucleotides is encapsulation in silica as described in Paunescu, D., Puddu, M., Soellner, J. et al. Reversible DNA encapsulation in silica to produce ROS-resistant and heat-resistant synthetic DNA 'fossils'. *Nat Protoc* 8, 2440-2448 (2013). Another technique is the integration of DNA into the genomes of bacteria or yeast which produce spores that contain and protect the DNA. See Qian, Jason, et al. "Barcoded microbial system for high-resolution object provenance." *Science* 368.6495, 1135-1140 (2020). Other ways of protecting molecules that could function as a molecular tag 102 are liposomes, multiple emulsions, solid fat particles, multiple emulsions, biopolymer particles, cubosomes, and biologically-derived systems. See McGlements, David Julian. "Encapsulation, protection, and release of hydrophilic active components: Potential and limitations of colloidal delivery systems." *Advances in colloid and interface science* 219: 27-53 (2015). Proteinosomes have also been used to encapsulate polynucleotides. See Joesaar. Alex, et al, "DNA-based communication in populations of synthetic protocells," *Nat Nanotechnol* 14.4: 369-378 (2019) and Yang, Shuo, et al. "Protocellular CRISPRICas-Based Diffusive Communication Using Transcriptional RNA Signaling." *Angewandte Chemie International Edition* e202202436 (2022), Thus, a person of ordinary skill in the art will appreciate that there are multiple possible ways of encapsulating a molecular tag 102. Encapsulated molecular tags 102 may be placed on a surface of an object 110 or embedded in the object 106.

If the object 106 is a composite object formed from multiple materials (e.g., a plastic bottle and the cap) each part of the composite object may be separately labeled with a different molecular tag 102. For example, a plastic bottle can be labeled with a molecular tag 102 that indicates the type of plastic used to make the bottle and the cap can be labeled with a different molecular tag 102 that indicates a different type of plastic used to make the cap. When multiple molecular tags 102 are present, they may be the same or different types of molecules. Additionally, how the molecular tags 102 are associated with parts of the composite object may be the same or different (e.g., one molecular tag 102 is applied to a surface of the object 110 and another molecular tag 102 is embedded within the object 106).

An object 106 without multiple parts or a single part of a composite object may also be associated with multiple molecular tags 102 (not shown). Additional molecular tags 102 may be added with material from the object 106 is processed during recycling and combined with other material that includes a different molecular tag 102. Thus, a recycled object may have a first molecular tag and a second molecular tag. Each of the different molecular tags may indicate a different source of material. For example, the first molecular tag may indicate a first source of material such as material that was originally used to make the object. The second molecular tag may indicate a second source of material such as material that was added during recycling of the object 106 to make a recycled object.

Figure 2:
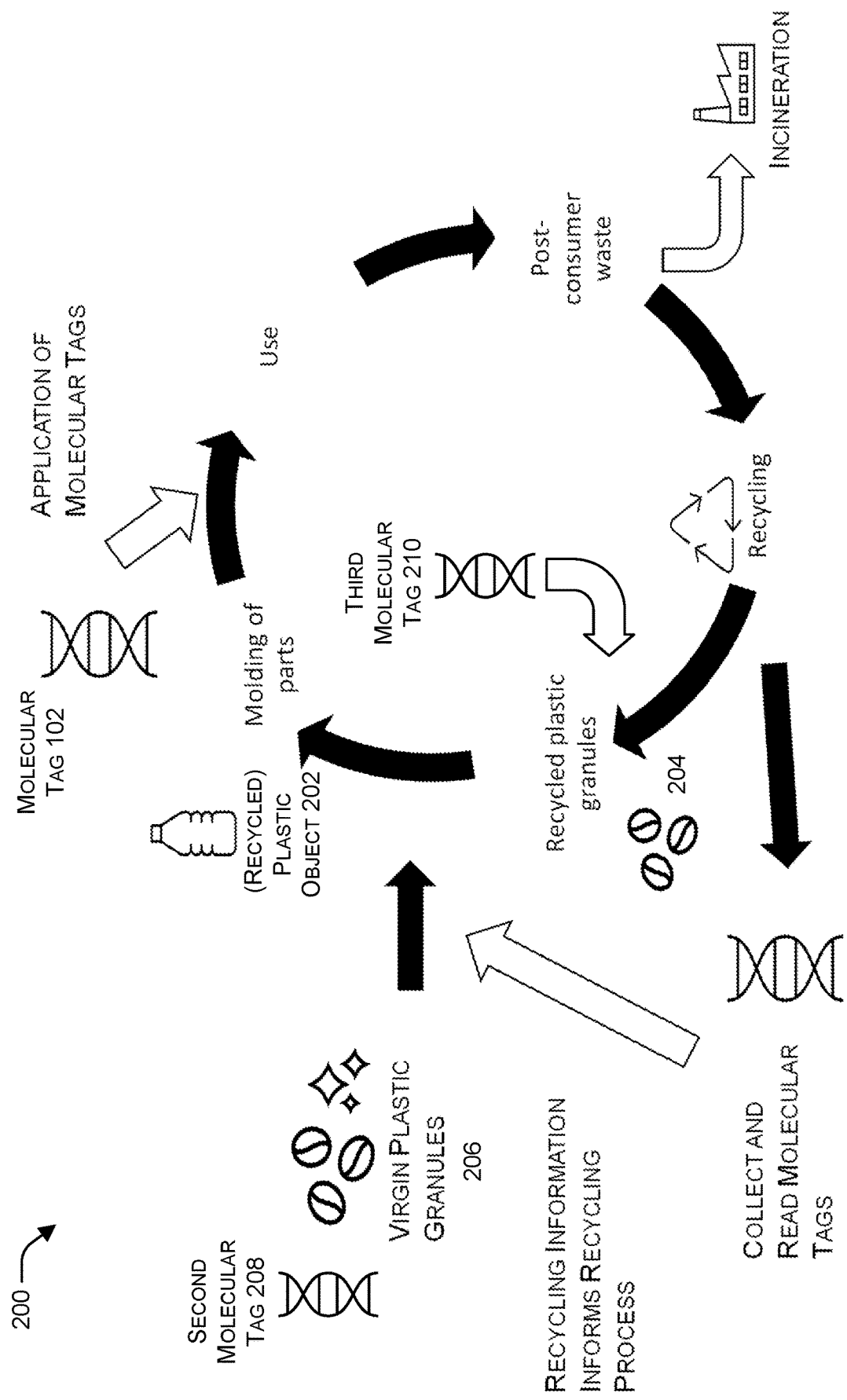
FIG. 2 is a diagram that illustrates a lifecycle of a plastic object and recycling of the plastic object.

FIG. 2 shows an example lifecycle 200 of a plastic object 202. A molecular tag 102 is applied to the plastic object 202 using any of the techniques described previously. For example, the molecular tag 102 may be applied to a surface of the plastic object 202 after molding the part(s) to form the plastic object 202. The plastic object 202 is then used by consumers. At the end of life, the plastic object 202 becomes post-consumer waste that may be incinerated, sent to a landfill, or recycled. If recycled, the molecular tag 102 is collected and read.

The molecular tag 102 may be collected by swabbing or taking a sample from a surface of the plastic object 202. If the molecular tag 102 is adsorbed to a surface of the plastic object 202, the molecular tag 102 may be freed from the plastic object 202. If poly(L-DOPA) is used to adhere polynucleotides to a surface, then the polynucleotides may be released by washing with a basic solution. A molecular tag 102 that is embedded in the plastic object 202 is first released from the plastic object 202 such as by melting the plastic object 202 into a liquid and then separating the molecular tag 102 from the liquid. For a molecular tag 102 that is encapsulated in protective material, the encapsulation is broken and the molecular tag 102 is freed from within. With any of these techniques, ultimately the molecular tag 102 is separated from the plastic object 202.

The molecular tag 102 is read to ascertain the molecular encoding which is decoded to recover the recycling information. The specific technique for reading the molecular tag 102 depends on the type of molecular tag 102. A polynucleotide may be read by a DNA sequencer using conventional techniques. Hybridization of polynucleotides complementary to the molecular tag 102 and attached to detectable probes (e.g., fluorophores) may be used to read a polynucleotide without explicitly determining the sequence. One technique for determining the sequence of DNA molecules without full sequencing is described in Berk, K., et al. Rapid Visual Authentication Based on DNA Strand Displacement. *ACS Applied Materials & Interfaces* 13 (16), 19476-19486 (2021). If the molecular tag 102 is protein, the sequence of the protein may be determined by techniques known to those of ordinary skill in the art such as mass spectrometry and Edman degradation. Metal ion tags can be read by nuclear magnetic resonance (NMR). Chromophores and fluorophores may be read by visual inspection under natural light or light of a specific wavelength such as infrared. The light may be captured with a camera and quantified or compared to a baseline.

The recycling information obtained from reading the molecular tag 102 is used to inform the recycling process. For some plastic objects 202, the recycling process may begin by making recycled plastic granules 204 from the plastic object 202. The recycled plastic granules 204 may still be associated with the molecular tag 102 for example if the many copies of the molecular tag 102 are embedded throughout all of the plastic object 202. In this implementation, there will be some copies of the molecular tag 102 embedded in each of the recycled plastic granules 204. Unlike embossed markings or labels, the tag is present in each of the recycled plastic granules 204 so the type of plastic can be identified from any of the recycled plastic granules 204.

The recycling information may be used to determine any aspect of the recycling process such as the size of plastic granules that should be created from the plastic object 202, time or temperatures for performing the recycling, the type of material to mix with the recycled plastic granules 204, or other information. Other information potentially relevant when deciding how to recycle a plastic object 202 includes the number of times material in the plastic object 202 has been previously recycled and the age of the object. The molecular tag 102 may encode either or both the number of times the plastic object 202 has been recycled and a date of manufacture. The recycling information may also contain tracking or supply chain data that indicate such things as where the plastic was originally created, a facility location or name, or the presence of any previously recycled content. Other supply chain information may include a manufacture or "responsible entity" for the object that is used to track chain of custody and provide credit for recycling efforts. For example, the molecular tag 102 on a plastic bottle may encode the identify of a beverage company so that the recycling rate of bottles used by that company can be tracked.

In one implementation, the recycled plastic granules 204 are combined with virgin plastic granules 206. The virgin plastic granules 206 may be formed from the same type of plastic as the recycled plastic granules 204 (e.g., both polyethylene terephthalate or both high-density polyethylene). The virgin plastic granules 206 and the recycled plastic granules 204 may be combined in any ratio such as 50% of each, 30% virgin plastic granules 206 and 70% recycled plastic granules 204, 70% virgin plastic granules 206 and 30% recycled plastic granules 204, or another ratio.

The virgin plastic granules 206 are labeled with a second molecular tag 208. The second molecular tag 208 may be applied to the surface of the virgin plastic granules 206 or embedded throughout the virgin plastic granules 206. The second molecular tag 208 and the molecular tag 102 may be the same or different types of molecules. For example, both the molecular tag 102 and the second molecular tag 208 may be polynucleotides. Alternatively, one of the tags may be a polynucleotide and the other may be a protein.

In some implementations, a third molecular tag 210 may be added to the recycled plastic granules 204. The third molecular tag 210 may be added instead of the molecular tag 102 or in addition. If the plastic object 202 was not labeled with a molecular tag, the recycling process provides an opportunity to add the third molecular tag 210. The third molecular tag 210 may encode any of the types of information encoded by the other molecular tags. In some implementations, the third molecular tag 210 may encode information related to the recycling process such as an identifier or code representing the recycling facility, a timestamp, or other information.

A recycled plastic object is created from the combination of the recycled plastic granules 204 and the virgin plastic granules 206. The recycled plastic object occupies the same place in the diagram as the plastic object 202. The specific technique for forming the recycled plastic object depends on the type of plastic and the object. For example, both the virgin plastic granules 206 and the recycled plastic granules 204 may be melted to form a homogenous liquid. That liquid plastic can then be formed into the recycled plastic object. One illustrative technique is injection molding.

Thus, the recycled plastic object can have both the molecular tag 102 and the second molecular tag 208 embedded throughout. The molecular tag 102 and the second molecular tag 208 may encode the same or different information. For example, both tags may simply encode the type of plastic (e.g., #1, #2, etc.). Thus, once mixed the molecular tag 102 and the second molecular tag 208 may be indistinguishable if both are the same type of molecule and have the same structure—encoding the same information. Thus, the recycled plastic object can have two (or more) molecular tags added at different times.

However, in implementations in which the molecular tag 102 and the second molecular tag 208 encode different information, both tags are read and decoded when the recycled plastic object reaches the end of its life cycle and is recycled. Information encoded by a molecular tag 102 may include a timestamp, a facility identifier, or other information. Thus, by reading both the molecular tag 102 and the second molecular 208 it may be possible to determine when the plastic object 202 was first created and when the recycled plastic object was created from the recycled plastic granules 204. This can be used to calculate how long the plastic object 202 was in use before it was recycled. Similarly, the locations of the manufacturing facility for the plastic object 202 and the recycling facility that mixed in the virgin plastic granules 206 may be identified. From this information it is possible to determine where the plastic object 202 was transported between manufacture and recycling. In these implementations, the molecular tag can indicate a first source of material (e.g., the recycled plastic granules 204) and the second molecular tag can indicate a second source of material (e.g., the virgin plastic granules 206).

The relative frequency with which the copies of molecular tag 102 and copies of the second molecular tag 208 are found in the recycled plastic object can indicate the percentage of recycled content in the recycled plastic object. If, for example, 30% of the tags found in the recycled plastic object are the molecular tag 102 and 70% are the second molecular tag 208, then there is 30% recycled content.

If a plastic object 202 is recycled multiple times, a different molecular tag may be added during each round of recycling. Thus, the number of different molecular tags in a recycled plastic object may be used as an indicator of the number of times the object was recycled. In one round of recycling, virgin plastic granules 206 may be added when creating a recycled plastic object as shown in FIG. 2. In one round of recycling, recycled plastic granules 204 from the plastic object 202 may be combined with recycled plastic granules from another source to create the recycled plastic object. So long as each additional molecular tag is different from the previous tags, it can serve as an indicator of another instance of recycling.

Although FIG. 2 illustrates and describes a plastic object, persons of ordinary skill in the art will understand that these features and processes can be generalized to objects made of a material other than plastic.

Figure 3:
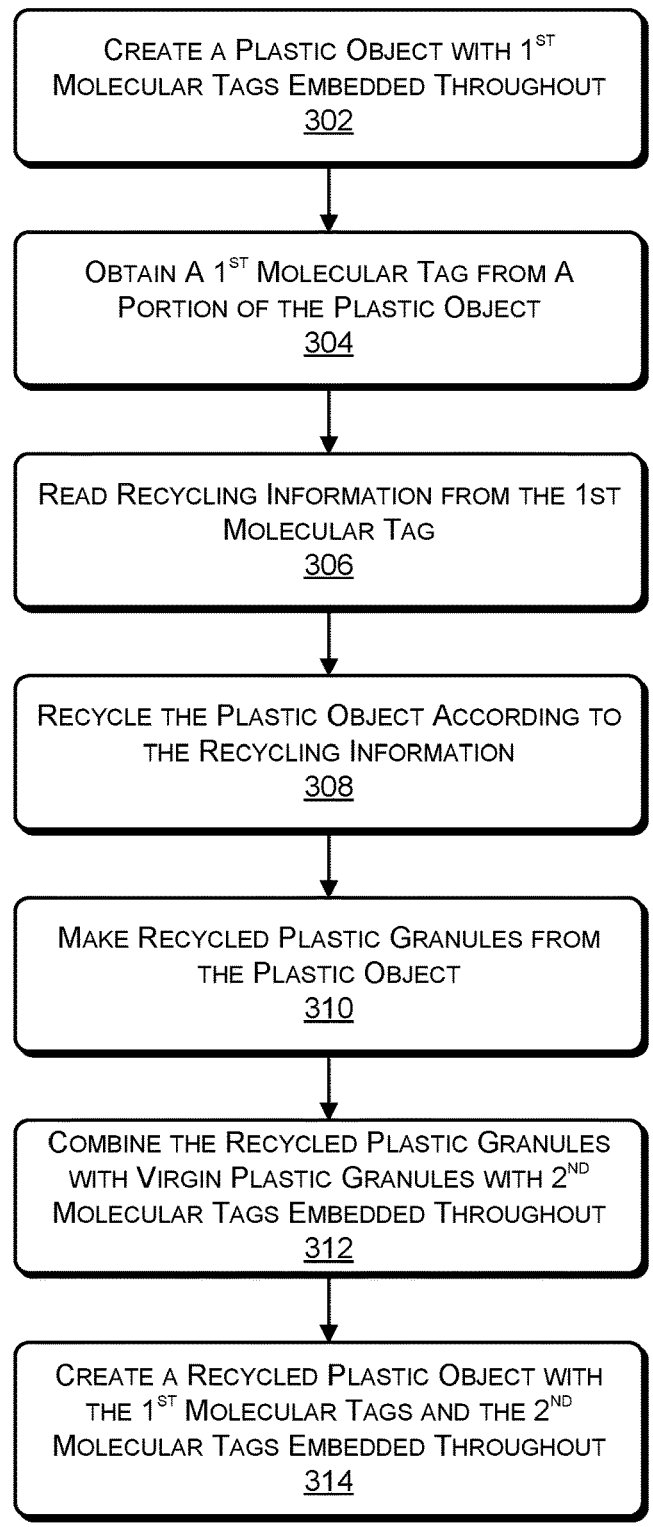
FIG. 3 is a flow diagram showing an illustrative method for creating and recycling a plastic object that has recycling information contained in embedded molecular tags.

FIG. 3 is a flow chart of a method 300 showing some aspects of the techniques and processes illustrated in FIG. 2. At operation 302, a plastic object is created with a first molecular tags embedded throughout the plastic object. The first molecular tags may be any type of molecular tag and may be encapsulated in a protective coating before embedding in the plastic object.

At operation 304, one of the first molecular tags is obtained from a portion of the plastic object. Because the first molecular tags are distributed throughout the plastic object, any portion may be used to obtain one of the first molecular tags. The specific technique for obtaining the molecular tag will depend on the type of plastic object, the type of molecule used to make the first molecular tags, and any encapsulation or protection provided to the first molecular tags. A molecular tag embedded in the plastic object can be released from the plastic object by melting the plastic object into a liquid and then separating the molecular tag from the liquid. For a molecular tag that is encapsulated in protective material, the encapsulation is broken and the molecular tag is freed from within. With any of these techniques, ultimately the molecular tag is separated from the plastic object and isolated or purified so that the structure of the molecular tag can be read.

At operation 306, recycling information is read from the one of the first molecular tags. The specific technique for reading the recycling information depends on the type of molecular tag and encoding used. For example, if the first molecular tags are polynucleotides, polynucleotide sequencing may be used to determine the sequence of the polynucleotides and the nucleotide sequence is decoded into human-readable information. The recycling information includes at least information that informs how the plastic object can be recycled. In some instances, for example when the type of plastic in the plastic object is known without reading the molecular tag, operations 304 and 306 may be skipped. The molecular tag will remain and be included in any recycled material created from the plastic object but does not necessarily need to be read during every round of recycling.

At operation 308, the plastic object is recycled according to the recycling information. If the recycling information simply identifies the type of plastic used to make the plastic object, the plastic object may be recycled according to a known technique for that type of plastic. If the recycling information provides specific recycling techniques, the plastic object is then recycled as described in those techniques.

At operation 310, recycled plastic granules are made from the plastic object. This is one illustrative way to begin the recycling of a plastic object. However, in other implementations the plastic object may be mechanically shredded and/or melted down without being formed into granules.

At operation 312, the recycled plastic granules are combined with virgin plastic granules. This creates a mixture of plastic granules that is further processed such as by melting or chemical treatment. The virgin plastic granules may have second molecular tags embedded throughout.

At operation 314, a recycled plastic object is created from the recycled plastic granules and the virgin plastic granules. For example, the recycled plastic object may be created by melting the granules and then molding the recycled plastic object from the liquid plastic. The recycled plastic object will have the first molecular tags and the second molecular tags embedded throughout.

Figure 4:
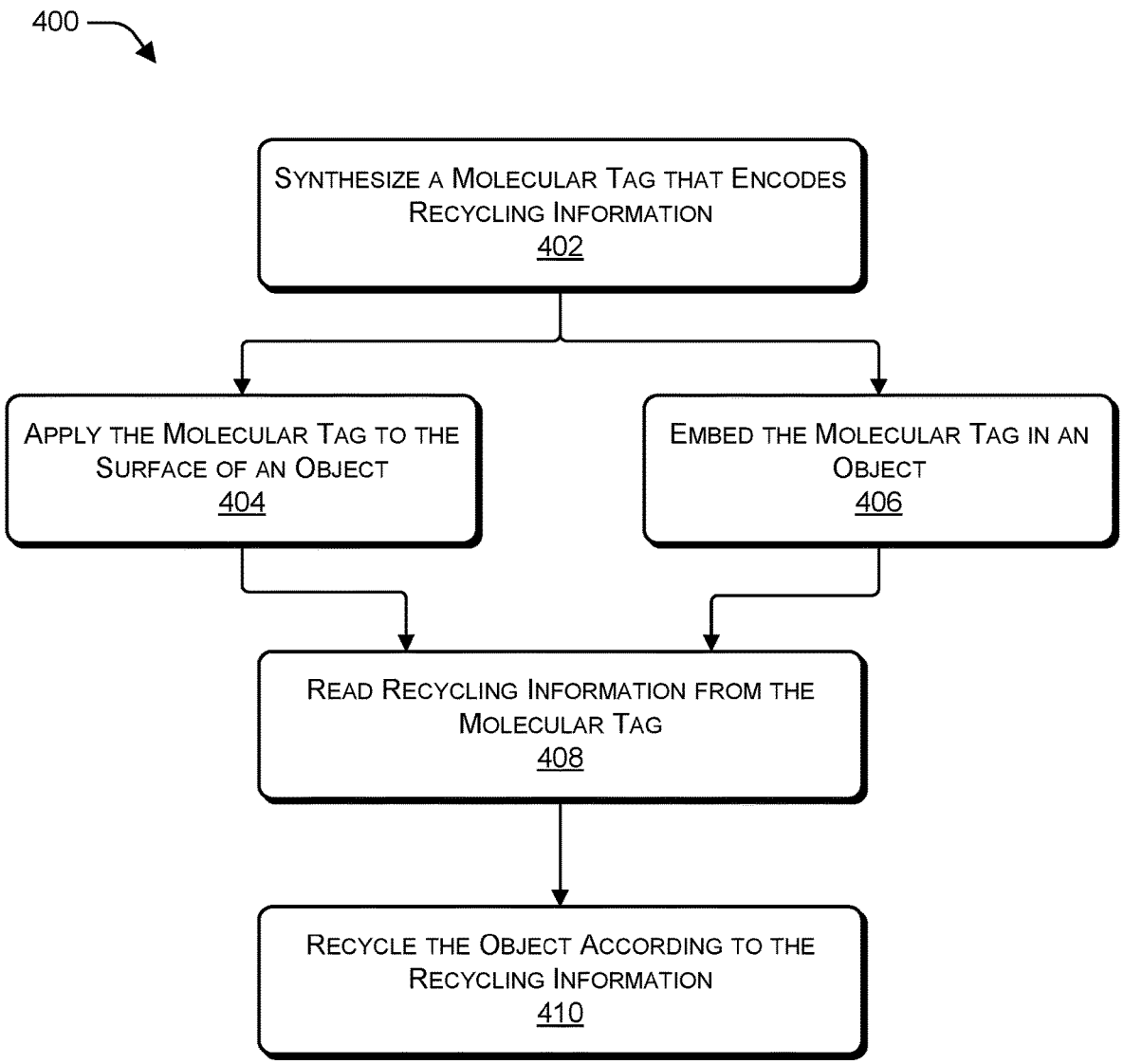
FIG. 4 is a flow diagram showing an illustrative method for labeling an object with a molecular tag that includes recycling information and using that recycling information to recycle the object.

FIG. 4 is a flow chart of a method 400 for using a molecular tag to determine how to recycle an object. This method 400 is similar to yet more general than the method 300 illustrated in FIG. 3.

At operation 402, a molecular tag is synthesized that encodes recycling information. The specific technique for synthesizing the molecular tag will depend on the type of molecule used to make the molecular tag. Generally, the recycling information is encoded from human-readable form to a structure that is represented by the molecular tag. For molecular tags that are polymers, the order of monomer subunits may be used to encode the recycling information. If the molecular tag is a polynucleotide, for example, any standard polynucleotide synthesis technique capable of creating a polynucleotide with a non-random sequence of nucleotides may be used. The recycling information may include at least one of a technique for recycling the object, a type of material used to create the object, a number of times the object has been recycled, or an identifier of a facility that created the object or previously recycled the object.

In many implementations, a large number of copies of the molecular tag are created. Each copy may be identical or may have some level of variation but will still encode the same recycling information. Thus, references to a single molecular tag are understood to also include a plurality of molecular tags all encoding the same recycling information. A batch of multiple molecular tags may be used to tag a single object or many objects made of the same material. The molecular tags may be applied to the object in a number of ways.

At operation 404, in one implementation, the molecular tag is applied to a surface of the object such as an outer surface. In some implementations, the molecular tag may be simply placed on a surface of the object. Depending on the type of object and molecular tag, the molecular tag may adhere or be adsorbed to the 106 without any additional modifications. For example, polypeptides placed on a cloth of fibrous object 106 may stay in physical contact with the object without further modification. In some implementations either or both the object and the molecular tag are modified to enhance the association of the molecular tag with the object. For example, a surface of the object may be modified or functionalized to increase adsorption of the molecular tag.

At operation 406, in one implementation, the molecular tag is embedded in the object. The molecular tag may be embedded in the object by combining the molecular tag with a material in liquid form that is dried or hardened to create the object. For example, the molecular tag may be mixed with a plastic that is in liquid form before an object is created from injection molding the plastic. In some implementations, the molecular tag may both be applied to the surface of the object and embedded in the object. Moreover, the object may be tagged with two different molecular tags each encoding different recycling information with one of those tags applied to the surface of the object and one embedded within the object.

At operation 408, the recycling information is read from the molecular tag associated with the object. The molecular tag may first be separated from the object or isolated from a portion of the object. The molecular tag may then be cleaned or otherwise prepared for reading. The specific technique for reading the molecular tag will depend on the type of molecule used for the molecular tag. Techniques for reading the sequence of molecules such as polynucleotides and polypeptides are known to those of ordinary skill in the art.

The molecular tags and techniques for reading the molecular tags may be standardized. Thus, molecular tags encoding different recycling information and associated with different objects may all have a shared structure and one or more features in common. For example, the molecular tags may all be double-stranded DNA that is 160 nucleotides long. Standardized molecular tags may be applied to a wide range of objects such as plastic bottles, metals, paper products, and clothing. Thus, at a recycling facility the same technique could be used to collect and read molecular tags from any type of object. This provides a way to determine the type of material an object is made from and how to recycle that object without needing to analyze the object.

At operation 410, the object is recycled according to the recycling information. Thus, information encoded in the structure of a molecule associated with the object is used to determine how to recycle the object. Because this information is encoded by a molecular tag that can be attached to the surface of the object or embedded inside the object it is more difficult to separate from the object than other forms of tags or labels. Also due to the small size, a molecular tag can be placed on almost any object regardless of the object's size or shape.

Figure 5:
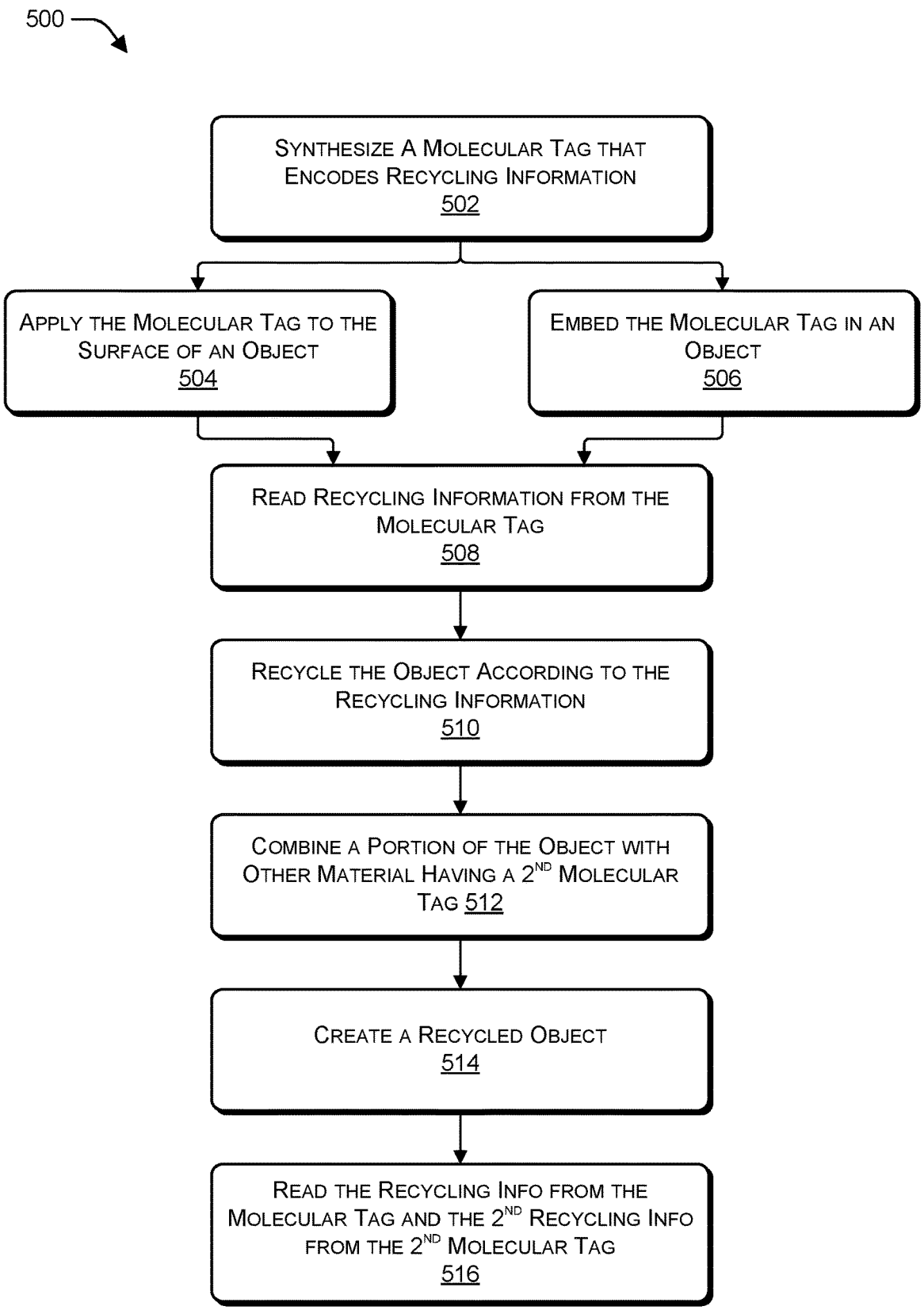
FIG. 5 is a flow diagram showing an illustrative method for using a molecular tag to associate recycling information with an object and recycling the object by combination with other material having a second molecular tag to create a recycled object with two molecular tags.

FIG. 5 is a flow chart of a method 500 for creating a recycled object labeled with multiple molecular tags. This method 500 has steps in common with the method 400 shown in FIG. 4 and is similar in part to the method 300 shown in FIG. 3.

At operation 502, a molecular tag is synthesized that encodes recycling information. The specific technique for synthesizing the molecular tag will depend on the type of molecule used to make the molecular tag. Generally, the recycling information is encoded from human-readable form to a structure that is represented by the molecular tag. For molecular tags that are polymers, the order of monomer subunits may be used to encode the recycling information. If the molecular tag is a polynucleotide, for example, any standard polynucleotide synthesis technique capable of creating a polynucleotide with a non-random sequence of nucleotides may be used. The recycling information may include at least one of a technique for recycling the object, a type of material used to create the object, a number of times the object has been recycled, or an identifier of a facility that created the object or previously recycled the object.

At operation 504, in one implementation, the molecular tag is applied to a surface of the object such as an outer surface. In some implementations, the molecular tag may be simply placed on a surface of the object. Depending on the type of object and molecular tag, the molecular tag may adhere or be adsorbed to the 106 without any additional modifications. For example, polypeptides placed on a cloth of fibrous object 106 may stay in physical contact with the object without further modification. In some implementations either or both the object and the molecular tag are modified to enhance the association of the molecular tag with the object. For example, a surface of the object may be modified or functionalized to increase adsorption of the molecular tag.

At operation 506, in one implementation, the molecular tag is embedded in the object. The molecular tag may be embedded in the object by combining the molecular tag with a material in liquid form that is dried or hardened to create the object. For example, the molecular tag may be mixed with a plastic that is in liquid form before an object is created from injection molding the plastic. In some implementations, the molecular tag may both be applied to the surface of the object and embedded in the object. Moreover, the object may be tagged with two different molecular tags each encoding different recycling information with one of those tags applied to the surface of the object and one embedded within the object.

At operation 508, the recycling information is read from the molecular tag associated with the object. The molecular tag may first be separated from the object or isolated from a portion of the object. The molecular tag may then be cleaned or otherwise prepared for reading. The specific technique for reading the molecular tag will depend on the type of molecule used for the molecular tag. Techniques for reading the sequence of molecules such as polynucleotides and polypeptides are known to those of ordinary skill in the art.

At operation 510, the object is recycled according to the recycling information. Thus, information encoded in the structure of a molecule associated with the object is used to determine how to recycle the object. Because this information is encoded by a molecular tag that can be attached to the surface of the object or embedded inside the object it is more difficult to separate from the object than other forms of tags or labels. Also due to the small size, a molecular tag can be placed on almost any object regardless of the object's size or shape.

At operation 512, as part of recycling the object, at least a portion of the object is combined with other material having a second molecular tag. The portion of the object may be all or part of the object. In some implementations, the object is mechanically fragmented during the recycling process. For example, plastic granules may be created from the object as shown in FIG. 2.

The other material may be the same type of material as the portion of the object. For example, the object and the other material may both be made from the same type of plastic such as polyethylene terephthalate. One example of this is adding virgin material to the material obtained from the object. This is shown for the plastic item in FIG. 2. Alternatively, the other material may be a different type of material. For example, two more different types of plastics may be combined to make a recycled object formed from a mixture or blend of plastics.

The second molecular tag may be applied to the surface of the other material or embedded throughout the other material. The second molecular tag and the molecular tag may be the same or different types of molecules. For example, both the molecular tag and the second molecular tag may be polynucleotides. Alternatively, one of the tags may be a polynucleotide and the other may be a protein.

The molecular tag and the second molecular tag may encode the same or different information. For example, both tags may simply encode the type of plastic (e.g., #1, #2, etc.). Thus, once the materials are combined, the molecular tag and the second molecular tag may be indistinguishable (i.e., if both are the same type of molecule and encode the same information). Thus, recycling can create an object with two (or more) molecular tags that were added at different times. However, in implementations in which the molecular tag 102 and the second molecular tag 208 encode different information, both tags will be present and distinguishable from each other.

At operation 514, a recycled object is created from the portion of the object and the other material. Thus, the recycled object includes both the molecular tag associated with the object and the second molecular tag associated with the other material used during the recycling process. The recycled object may be the same type of object as the object that was recycled. For example, a plastic bottle may be recycled into another plastic bottle. However, the recycled object may be a different type of object than the object that was recycled. For example, a plastic bottle may be recycled into a jacket. The specific technique for creating the recycled object will depend on the type of material being recycled and the object.

At operation 516, recycling information is read from the first molecular tag and the second molecular tag. The reading may be performed many days, weeks, months, or years after the recycled object was created. The reading may be performed at a recycling facility when the recycled object reaches the end of its life cycle and is recycled.

Information encoded by either or both of the molecular tag and the second molecular tag may include a timestamp, a facility identifier, or other information. Thus, by reading both the molecular tag and the second molecular it may be possible to determine when the object was first created and when the other material was added to create the recycled object. This can be used to calculate how long the object was in use before it was recycled into the recycled object. Similarly, the locations of the manufacturing facility for the object and the recycling facility that added the other material may be identified. From this information it is possible to determine where the object was transported between manufacture and recycling.

Presence of the molecular tag in the recycled object may serve as proof that the recycled object contains recycled material. Additionally, the ratio of the molecular tag to the second molecular can indicate the percentage of recycled content in the recycled object. Some objects, such as plastic bottles, may be recycled multiple times. Each time another molecular tag can be added with the other material. The molecular tag, the second molecular tag, or both may indicate the number of times that the recycled object was recycled. For example, the second molecular tag could encode the information that the recycled object was recycled once. The presence of two different molecular tags (i.e., one from creation of the object and one from creation of the recycled object) could be interpreted as an indicator that the object was recycled once. Similarly, a higher number of distinct molecular tags could serve to indicate that the recycled object was recycled a greater number of times (e.g., four molecular tags indicate recycling three times).

Figure 6:
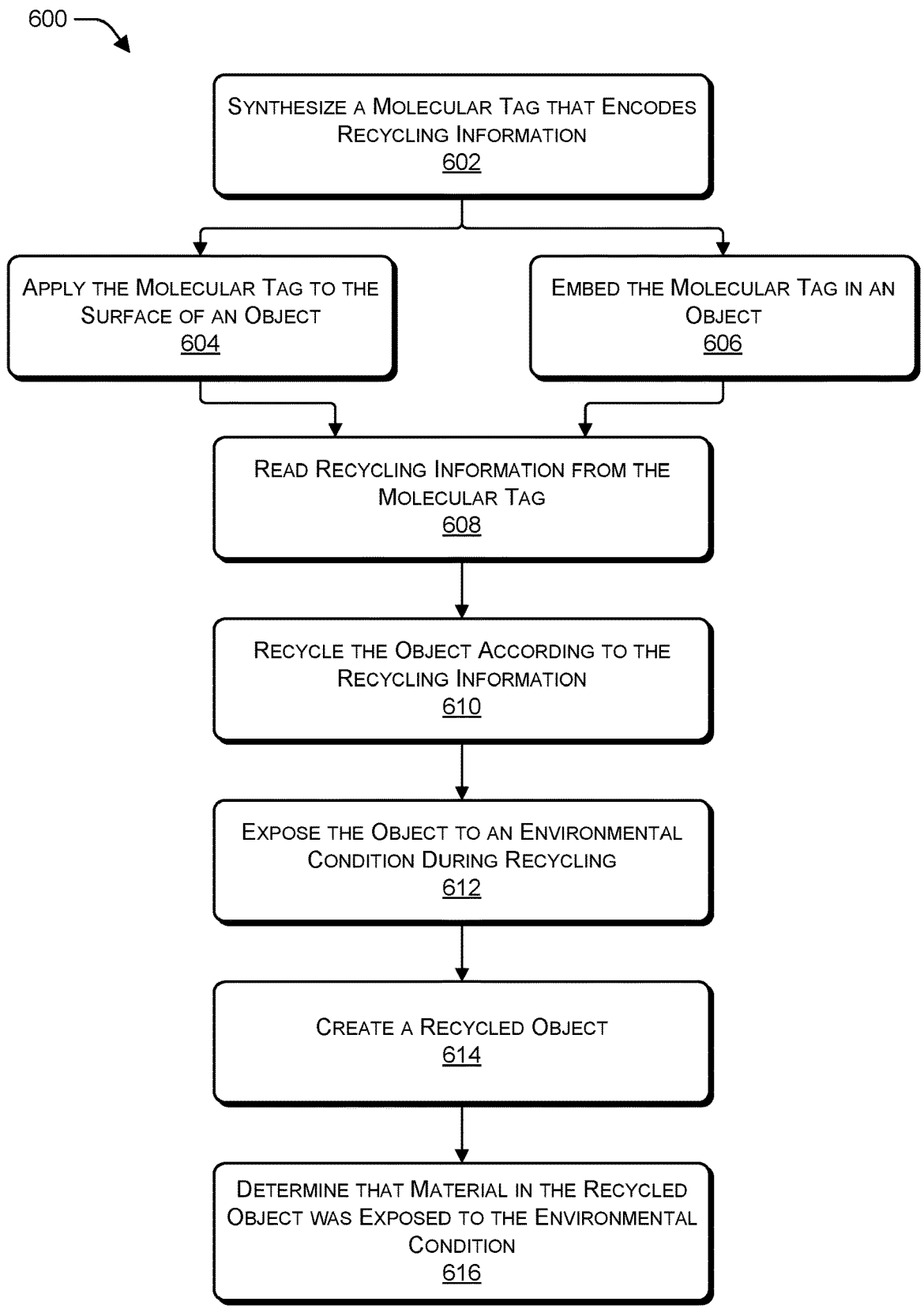
FIG. 6 is a flow diagram showing an illustrative method for using a molecular tag to encode recycling information for an object and to detect an environmental condition that the object was exposed to during recycling.

FIG. 6 is a flow chart of a method 600 for using molecular tags to determine environmental conditions that an object was exposed to during recycling. This method 600 has steps in common with the method 400 shown in FIG. 4 and the method 500 shown in FIG. 5.

At operation 602, a molecular tag is synthesized that encodes recycling information. The specific technique for synthesizing the molecular tag will depend on the type of molecule used to make the molecular tag. Generally, the recycling information is encoded from human-readable form to a structure that is represented by the molecular tag. For molecular tags that are polymers, the order of monomer subunits may be used to encode the recycling information. If the molecular tag is a polynucleotide, for example, any standard polynucleotide synthesis technique capable of creating a polynucleotide with a non-random sequence of nucleotides may be used. The recycling information may include at least one of a technique for recycling the object, a type of material used to create the object, a number of times the object has been recycled, or an identifier of a facility that created the object or previously recycled the object.

At operation 604, in one implementation, the molecular tag is applied to a surface of the object such as an outer surface. In some implementations, the molecular tag may be simply placed on a surface of the object. Depending on the type of object and molecular tag, the molecular tag may adhere or be adsorbed to the 106 without any additional modifications. For example, polypeptides placed on a cloth of fibrous object 106 may stay in physical contact with the object without further modification. In some implementations either or both the object and the molecular tag are modified to enhance the association of the molecular tag with the object. For example, a surface of the object may be modified or functionalized to increase adsorption of the molecular tag.

At operation 606, in one implementation, the molecular tag is embedded in the object. The molecular tag may be embedded in the object by combining the molecular tag with a material in liquid form that is dried or hardened to create the object. For example, the molecular tag may be mixed with a plastic that is in liquid form before an object is created from injection molding the plastic. In some implementations, the molecular tag may both be applied to the surface of the object and embedded in the object. Moreover, the object may be tagged with two different molecular tags each encoding different recycling information with one of those tags applied to the surface of the object and one embedded within the object.

At operation 608, the recycling information is read from the molecular tag associated with the object. The molecular tag may first be separated from the object or isolated from a portion of the object. The molecular tag may then be cleaned or otherwise prepared for reading. The specific technique for reading the molecular tag will depend on the type of molecule used for the molecular tag. Techniques for reading the sequence of molecules such as polynucleotides and polypeptides are known to those of ordinary skill in the art.

At operation 610, the object is recycled according to the recycling information. Thus, information encoded in the structure of a molecule associated with the object is used to determine how to recycle the object. Because this information is encoded by a molecular tag that can be attached to the surface of the object or embedded inside the object it is more difficult to separate from the object than other forms of tags or labels. Also due to the small size, a molecular tag can be placed on almost any object regardless of the object's size or shape.

At operation 612, the object is exposed to an environmental condition during recycling. The environmental condition changes a detectable characteristic of the molecular tag. For example, the environmental condition may be such things as high heat, cold, acidic conditions, basic conditions, oxidizing conditions, or exposure to one or more chemicals. For example, a molecular tag formed from double-stranded polynucleotides will denature when heated above a certain temperature (e.g., 95° C.) and may re-hybridize to different strands when cooled (e.g., by DNA strand displacement techniques). Thus, the double-stranded polynucleotides that have been heated and re-cooled will have detectably different double-stranded structures compared to those that have never been heated. Any other molecule that undergoes an irreversible change at a defined temperature may also function as a temperature sensor.

Changes in pH can be detected by fluorophores. Multiple examples of fluorophores that change color in response to pH changes (e.g., exposure to acid or base) are known to those of ordinary skill in the art. Thus, fluorophore tags on the surface of an object can be used to detect exposure to high or low pH. Fluorophores can also change following exposure to oxidative conditions. Oxidation can result in the loss of color or bleaching of some fluorophores. Thus, loss of fluorophore color can be a detectable characteristic that indicates exposure to oxidative conditions.

At operation 614, a recycled object is created from at least a portion of the object. The recycled object contains the molecular tag that has been modified following exposure to the environmental condition. The molecular tag may be read to obtain recycling information. Additionally, the modification(s) to the molecular tag may be detected and the environmental condition identified. For example, the molecular tag may be modified in a first way if the object was exposed to high heat during recycling. And the molecular tag may be modified in a second way if instead of high heat, the object was exposed to certain chemicals during recycling. Thus, the modifications to the molecular tag can provide a record of environmental conditions experienced by the recycled object that is integrated into the object itself.

At operation 616, it is determined that the material in the recycled object was exposed to the environmental conditions by identifying the detectable characteristic of the molecular tag. For example, the difference may be change in a pattern of doubled stranded nucleotide hybridization, change or loss of fluorophore color, or any other detectable change.

Figure 7:
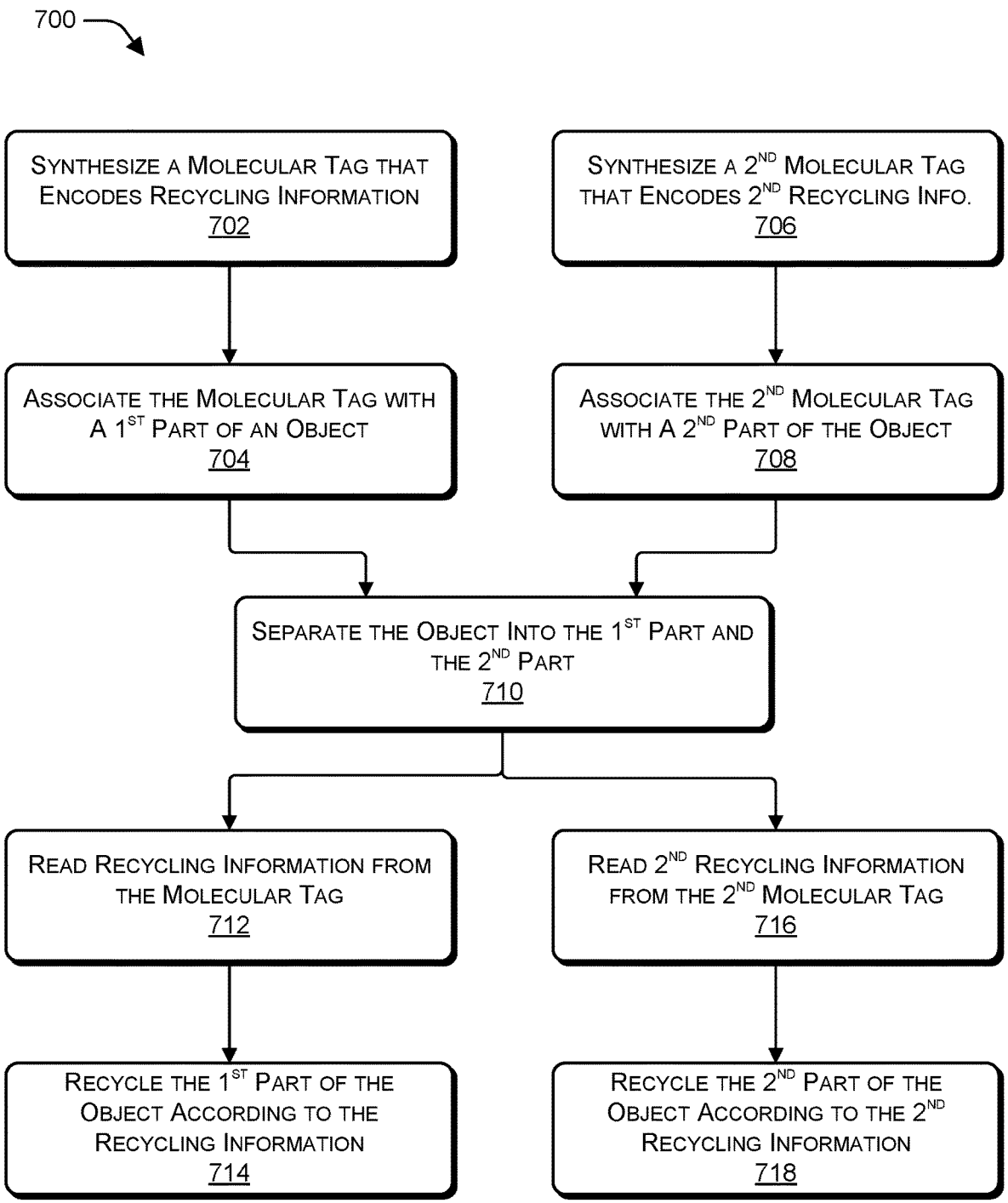
FIG. 7 is a flow diagram showing an illustrative method for using multiple molecular tags to label different parts of a composite object, separating the object into the different parts, and recycling each according to recycling information encoded by the respective molecular tags.

FIG. 7 is a flow chart of a method 700 for using molecular tags on two different parts of a composite object separately encode recycling information for each. This method 700 has steps that are similar to the method 400 shown in FIG. 4.

At operation 702, a molecular tag is synthesized that encodes recycling information. The specific technique for synthesizing the molecular tag will depend on the type of molecule used to make the molecular tag. Generally, the recycling information is encoded from human-readable form to a structure that is represented by the molecular tag. For molecular tags that are polymers, the order of monomer subunits may be used to encode the recycling information. If the molecular tag is a polynucleotide, for example, any standard polynucleotide synthesis technique capable of creating a polynucleotide with a non-random sequence of nucleotides may be used. The recycling information may include at least one of a technique for recycling the object, a type of material used to create the object, a number of times the object has been recycled, or an identifier of a facility that created the object or previously recycled the object.

At operation 704, the molecular tag is associated with a first part of the composite object. The molecular tag may be applied to a surface of the first part or may be embedded in the first part. In some implementations, the molecular tag may be embedded in the first part when that part is made which may be at a different location than where the composite object is made. Thus, the assembler or manufacturer of the composite object may receive with first part with the molecular tag already present.

At operation 706, a second molecular tag is synthesized that encodes second recycling information. The second molecular tag is synthesized by any technique appropriate for creating the second molecular tag. The second recycling information is different from the recycling information encoded in the molecular tag at operation 702. The second molecular tag may use the same or different type of molecule than the molecular tag. For example, the recycling information encoded by the molecular tag may be a first type of plastic and the second recycling information encoded by the second molecular tag may be a second, different type of plastic.

At operation 708, the second molecular tag is associated with a second part of the composite object. The second molecular tag may be associated with the second part of the composite object either by applying the second molecular tag to a surface of the second part or by embedding the second molecular tag in the second part. The second molecular tag may be associated with the second part a different location than where the composite object is made. Thus, the assembler or manufacturer of the composite object may receive the second part with the second molecular tag already present.

The second part of the composite object is separate and distinct from the first part of the composite object. For example, the first part of the composite object may be a plastic bottle and the second part of the composite object may be the cap to the bottle. The first part of the composite object and the second part of the composite object may be made of different materials and/or may be recycled through different processes. Thus, a single label or marking applied to the entire composite object that provides only one type of recycling information is unable to accurately describe how to recycle both the first part and the second part of the composite object.

At operation 710, the composite object is separated into the first part and the second part. If the composite object has more than two parts, each of the parts may be separated from the others. Parts that will not be recycled may be left assembled. The first part and the second part may be separated from the composite object before reading the respective molecular tags and the separation may be done even without knowledge that molecular tags are present.

At operation 712, the recycling information is read from the molecular tag associated with the first part of the object. The molecular tag may first be separated from the first part or isolated from a portion of the first part. The molecular tag may then be cleaned or otherwise prepared for reading. The specific technique for reading the molecular tag will depend on the type of molecule used for the molecular tag.

At operation 714, the first part of the object is recycled according to the first recycling information. Thus, information encoded in the structure of the first molecular tag is used to determine how to recycle the first part. Because this information is encoded by a molecular tag it can be attached to the surface of the first part or embedded inside and it is more difficult to separate from the object than other forms of tags or labels. Also due to the small size, a molecular tag can be placed on almost any part of the object regardless of the size or shape.

At operation 716, the second recycling information is read from the second molecular tag associated with the second part of the object. The second molecular tag may first be separated from the second part or isolated from a portion of the second part. The second molecular tag may then be cleaned or otherwise prepared for reading. The specific technique for reading the second molecular tag will depend on the type of molecule used for the second molecular tag.

At operation 718, the second part of the object is recycled according to the second recycling information. Thus, information encoded in the structure of the second molecular tag is used to determine how to recycle the second part. Thus, both the first part and the second part of the object are recycled according to the respective recycling information encoded by molecular tags associated with each part.

ILLUSTRATIVE EMBODIMENTS

The following clauses describe multiple possible embodiments for implementing the features described in this disclosure. Every feature from any given embodiment is not required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method of recycling a plastic object, the method comprising: creating the plastic object with first molecular tags embedded throughout the plastic object; obtaining a one of the first molecular tags from a portion of the plastic object; reading recycling information from the one of the first molecular tags; recycling the plastic object according to the recycling information, wherein recycling the plastic object comprises: making recycled plastic granules from the plastic object; combining the recycled plastic granules with virgin plastic granules, wherein the virgin plastic granules have second molecular tags embedded throughout; and creating a recycled plastic object from the recycled plastic granules and the virgin plastic granules, the recycled plastic object having the first molecular tags and the second molecular tags embedded throughout.

Clause 2. A method of recycling an object, the method comprising: reading recycling information from a molecular tag associated with the object; and recycling the object according to the recycling information.

Clause 3. The method of clause 1 or 2, further comprising synthesizing the molecular tag such that it encodes the recycling information.

Clause 4. The method of any of clauses 1 to 3, further comprising applying the molecular tag to a surface of the object.

Clause 5. The method of any of clauses 1 to 4, further comprising embedding the molecular tag in the object.

Clause 6. The method of any of clauses 1 to 5, wherein the recycling information comprises at least one of a technique for recycling the object, a type of material used to create the object, a number of times the object has been recycled, or an identifier of a facility that created the object or previously recycled the object.

Clause 7. The method of any of clauses 2 to 6, wherein recycling the object comprises combining at least a portion of the object with other material, wherein the other material comprises a second molecular tag.

Clause 8. The method of any of clauses 2 to 7, further comprising: creating a recycled object from the portion of the object and the other material; and reading the recycling information from the molecular tag and reading second recycling information from the second molecular tag.

Clause 9. The method of any of clauses 1 to 8, further comprising: exposing the object to an environmental condition during recycling that changes a detectable characteristic of the molecular tag; creating a recycled object from at least a portion of the object; and identifying the detectable characteristic of the molecular tag thereby determining that material in the recycled object was exposed to the environmental condition during recycling.

Clause 10. The method of any of clauses 2 to 9, wherein the object comprises a first part and a second part, the first part of the object is associated with the molecular tag and the second part of the object is associated with a second molecular tag and wherein the method further comprises: separating the object into the first part and the second part; reading second recycling information from the second molecular tag; recycling the first part of the object according to the recycling information; and recycling the second part of the object according to the second recycling information.

Clause 11. An object comprising a molecular tag encoding recycling information.

Clause 12. The object of clause 11, wherein the molecular tag is applied to a surface of the object.

Clause 13. The object of clause 11 or 12, wherein the molecular tag is embedded in the object.

Clause 14. The object of any of clauses 11 to 13, wherein the molecular tag is encapsulated in a protective covering.

Clause 15. The object of any of clauses 11 to 14, wherein the molecular tag comprises a polynucleotide.

Clause 16. The object of clause 15, wherein the polynucleotide is reversible attached to the object by electrostatic attraction to poly(L-DOPA).

Clause 17. The object of any of clauses 11 to 16, further comprising a second molecular tag encoding second recycling information.

Clause 18. The object of clause 17, wherein the recycling information encoded by the molecular tag indicates a first source of material used in the object and the second recycling information encoded by the second molecular tag indicates a second source of material.

Clause 19. The object of any of clauses 11 to 18, comprising a first part comprising a first type of material and a second part comprising a second type of material, wherein the first part is labeled with the molecular tag and the second part is labeled with a second molecular tag.

Clause 20. The object of any of clauses 11 to 20, wherein the recycling information comprises a technique for recycling the object, a type of material used to create the object, a number of times the object has been recycled, or an identifier of a facility that created the object or previously recycled the object.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced. As used herein, "approximately" or "about" or similar referents denote a range of ±10% of the stated value.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Furthermore, references have been made to publications, patents and/or patent applications throughout this specification. Each of the cited references is individually incorporated herein by reference for its particular cited teachings as well as for all that it discloses.

The invention claimed is:

1. A method of recycling a plastic object, the method comprising:
creating the plastic object with first molecular tags embedded throughout the plastic object;
obtaining a one of the first molecular tags from a portion of the plastic object;
reading recycling information from the one of the first molecular tags; and
recycling the plastic object according to the recycling information, wherein recycling the plastic object comprises:
making recycled plastic granules from the plastic object;
combining the recycled plastic granules with virgin plastic granules, wherein the virgin plastic granules have second molecular tags embedded throughout and the second molecular tags encode different information than the first molecular tags; and
creating a recycled plastic object from the recycled plastic granules and the virgin plastic granules, the recycled plastic object having the first molecular tags and the second molecular tags embedded throughout.

2. A method of recycling an object, the method comprising:
reading recycling information from a molecular tag associated with the object;
recycling the object according to the recycling information;
exposing the object to an environmental condition during recycling that changes a detectable characteristic of the molecular tag;
creating a recycled object from at least a portion of the object; and
identifying the detectable characteristic of the molecular tag thereby determining that material in the recycled object was exposed to the environmental condition during recycling.

3. The method of claim 2, further comprising synthesizing the molecular tag such that it encodes the recycling information.

4. The method of claim 2, further comprising applying the molecular tag to a surface of the object.

5. The method of claim 2, further comprising embedding the molecular tag in the object.

6. The method of claim 2, wherein the recycling information comprises at least one of a technique for recycling the object, a type of material used to create the object, a number of times the object has been recycled, or an identifier of a facility that created the object or previously recycled the object.

7. The method of claim 2, wherein recycling the object comprises combining at least a portion of the object with other material, wherein the other material comprises a second molecular tag.

8. The method of claim 7, further comprising:
creating a recycled object from the portion of the object and the other material; and
reading the recycling information from the molecular tag and reading second recycling information from the second molecular tag.

9. The method of claim 2, wherein the object comprises a first part and a second part, the first part of the object is associated with the molecular tag and the second part of the object is associated with a second molecular tag and wherein the method further comprises:
separating the object into the first part and the second part;
reading second recycling information from the second molecular tag;
recycling the first part of the object according to the recycling information; and
recycling the second part of the object according to the second recycling information.

10. An object comprising a molecular tag encoding recycling information, wherein the recycling information comprises a technique for recycling the object, a type of material used to create the object, a number of times the object has been recycled, or an identifier of a facility that created the object or previously recycled the object.

11. The object of claim 10, wherein the molecular tag is applied to a surface of the object.

12. The object of claim 10, wherein the molecular tag is embedded in the object.

13. The object of claim 10, wherein the molecular tag is encapsulated in a protective covering.

14. The object of claim 10, wherein the molecular tag comprises a polynucleotide.

15. The object of claim 14, wherein the polynucleotide is reversible attached to the object by electrostatic attraction to poly(L-DOPA).

16. The object of claim 10, further comprising a second molecular tag encoding second recycling information.

17. The object of claim 16, wherein the recycling information encoded by the molecular tag indicates a first source of material used in the object and the second recycling information encoded by the second molecular tag indicates a second source of material.

18. The object of claim 10, comprising a first part comprising a first type of material and a second part comprising a second type of material, wherein the first part is labeled with the molecular tag and the second part is labeled with a second molecular tag.

19. The method of claim 2, wherein the environmental condition is one of high heat, cold, acidic conditions, basic conditions, oxidizing conditions, or exposure to one or more chemicals.

20. The object of claim 10, wherein the polynucleotide is reversible attached to the object by electrostatic attraction.

* * * * *